(12) United States Patent
Sato

(10) Patent No.: US 7,843,647 B2
(45) Date of Patent: Nov. 30, 2010

(54) IMAGING APPARATUS, IMAGING METHOD AND HIGH ZOOM RATIO ZOOM LENS SYSTEM

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 269 days.

(21) Appl. No.: 12/160,568

(22) PCT Filed: Feb. 21, 2007

(86) PCT No.: PCT/JP2007/053696

§ 371 (c)(1),
(2), (4) Date: Jul. 10, 2008

(87) PCT Pub. No.: WO2007/113952

PCT Pub. Date: Oct. 11, 2007

(65) Prior Publication Data

US 2010/0232032 A1    Sep. 16, 2010

(30) Foreign Application Priority Data

Mar. 31, 2006  (JP)  ............................ 2006-099295

(51) Int. Cl.
*G02B 15/14* (2006.01)

(52) U.S. Cl. .................. 359/676; 359/683; 359/694; 348/240.99

(58) Field of Classification Search ......... 359/554–557, 359/676, 683–685, 694–698; 396/72–88; 348/240.99–240.3, 335–369
See application file for complete search history.

(56) References Cited

U.S. PATENT DOCUMENTS 5,579,171 A    11/1996  Suzuki et al.
5,587,739 A    12/1996  Suzuki et al.
7,251,081 B2   7/2007   Sato
2006/0067660 A1  3/2006  Seo
2008/0297901 A1*  12/2008  Mitsuki .................. 359/557

FOREIGN PATENT DOCUMENTS

| JP | 5-37849 A | 2/1993 |
| JP | 05-037849 A | 2/1993 |
| JP | 06-160779 A | 6/1994 |
| JP | 6-289298 A | 10/1994 |
| JP | 6-339054 A | 12/1994 |
| JP | 2001-337272 A | 12/2001 |
| JP | 2004-252196 A | 9/2004 |
| JP | 2006-106091 A | 4/2006 |

* cited by examiner

*Primary Examiner*—Darryl J Collins
(74) *Attorney, Agent, or Firm*—Miles & Stockbridge P.C.

(57) ABSTRACT

Providing an imaging apparatus capable of efficiently using effective pixels of a solid-state imaging device, and securing excellent peripheral light quantity of an image even upon vibration reduction. The imaging apparatus comprising: a high zoom ratio zoom lens 2 including, in order from the object, a first positive group, a second negative group, a third group, a fourth group, and a fifth group, upon zooming the first through fourth groups are moved along an optical axis; an imaging device capturing an image formed by the lens 2; a detector detecting variation in an image position; a driver moving the imaging device substantially perpendicularly to the optical axis; a controller controlling the driver for correcting variation in the image position; and a shield with an aperture for limiting bundle of rays incident on the periphery of the most object side lens in the lens 2; and given condition is satisfied.

19 Claims, 11 Drawing Sheets

IMAGING APPARATUS, IMAGING METHOD AND HIGH ZOOM RATIO ZOOM LENS SYSTEM

TECHNICAL FIELD

The present invention relates to an imaging apparatus, an imaging method and a high zoom ratio zoom lens system.

BACKGROUND ART

There has been proposed an imaging apparatus that reads out image information in a designated image frame as an object image from image information obtained by a solid-state imaging device, and is suitably changing the read out position of the designated image frame in accordance with variation in a position of the object image caused by a play of the lens barrel upon zooming a zoom lens system so as to correct the variation (for example, Japanese Patent Application Laid-Open No. 5-37849).

Moreover, there has been proposed an imaging apparatus capable of moving a solid-state imaging device in a direction along an optical axis in order to correct variation in an object image position along the optical axis caused upon zooming (for example, Japanese Patent Application Laid-Open No. 6-339054).

However, since the imaging apparatus disclosed in Japanese Patent Application Laid-Open No. 5-37849 reads out image information in a designated image frame as an object image from image information obtained by a solid-state imaging device as described above, effective pixels of the solid-state imaging device cannot be efficiently used.

On the other hand, the imaging apparatus disclosed in Japanese Patent Application Laid-Open No. 6-339054 can efficiently use effective pixels of the solid-state imaging device. However, when variation in the object image position caused by moving the solid-state imaging device along the optical axis is be corrected, light quantity becomes uneven on the corner of the object image.

DISCLOSURE OF THE INVENTION

The present invention is made in view of the aforementioned problems and has an object to provide an imaging apparatus, an imaging method, and a high zoom ratio zoom lens system carrying out vibration reduction by moving a solid-state imaging device in a direction substantially perpendicular to an optical axis, capable of efficiently using effective pixels of the solid-state imaging device, and capable of securing an excellent peripheral light quantity ratio of an object image even upon carrying out vibration reduction.

According to a first aspect of the present invention, there is provided an imaging apparatus comprising: a high zoom ratio zoom lens system comprising, in order from an object, a first lens group having positive refractive power, a second lens group having negative refractive power, a third lens group, a fourth lens group, and a fifth lens group, upon zooming from a wide-angle end state to a telephoto end state, the first lens group, the second lens group, the third lens group, and the fourth lens group being moved along an optical axis; a solid-state imaging device capturing an object image formed by the high zoom ratio zoom lens system; a detecting member that detects variation in a position of the object image; a driving member that moves the solid-state imaging device in a direction substantially perpendicular to the optical axis; a control member that controls the driving member in order to correct variation in the position of the object image; and a shield member with an aperture portion for limiting bundle of rays incident on the periphery of the most object side lens in the first lens group of the high zoom ratio zoom lens system; and the following conditional expression being satisfied:

$$0.05 < \{L \times (\Delta ht/ft)\}/(\Phi 1 - \Phi 0) < 2.00$$

where $\Phi 0$ denotes an effective diameter of the most object side lens in the first lens group of the high zoom ratio zoom lens system, $\Phi 1$ denotes a diameter of the aperture portion in the shield member, $\Delta ht$ denotes the maximum moving amount of the solid-state imaging device in the telephoto end state, $ft$ denotes a focal length of the high zoom ratio zoom lens system in the telephoto end state, and L denotes a total lens length of the high zoom ratio zoom lens system in the wide-angle end state.

According to a second aspect of the present invention, there is provided an imaging method for capturing an object image formed by a high zoom ratio zoom lens system by means of a solid-state imaging device with detecting variation in a position of the object image, and moving the solid-state imaging device in a direction substantially perpendicular to the optical axis so as to correct variation in the position of the object image, the imaging method comprising steps of: providing the high zoom ratio zoom lens system comprising, in order from the object, a first lens group having positive refractive power, a second lens group having negative refractive power, a third lens group, a fourth lens group, and a fifth lens group, upon zooming from a wide-angle end state to a telephoto end state, the first lens group, the second lens group, the third lens group, and the fourth lens group being moved along the optical axis; limiting bundle of rays incident on the periphery of the most object side lens in the first lens group of the high zoom ratio zoom lens system by a shield member with an aperture portion; and satisfying the following conditional expression:

$$0.05 < \{L \times (\Delta ht/ft)\}/(\Phi 1 - \Phi 0) < 2.00$$

where $\Phi 0$ denotes an effective diameter of the most object side lens in the first lens group of the high zoom ratio zoom lens system, $\Phi 1$ denotes a diameter of the aperture portion in the shield member, $\Delta ht$ denotes the maximum moving amount of the solid-state imaging device in the telephoto end state, $ft$ denotes a focal length of the high zoom ratio zoom lens system in the telephoto end state, and L denotes a total lens length of the high zoom ratio zoom lens system in the wide-angle end state.

According to a third aspect of the present invention, there is provided a high zoom ratio zoom lens system that is used as an image-taking lens of an imaging apparatus having a configuration that upon capturing an object image formed by the image-taking lens by means of a solid-state imaging device, variation in a position of the object image is detected, and in order to correct variation in the position of the object image the solid-state imaging device is moved in a direction substantially perpendicular to an optical axis, the high zoom ratio zoom lens system comprising, in order from the object: a first lens group having positive refractive power; a second lens group having negative refractive power; a third lens group; a fourth lens group; and a fifth lens group, upon zooming from a wide-angle end state to a telephoto end state, the first lens group, the second lens group, the third lens group and the fourth lens group being moved along the optical axis, a shield member with an aperture portion for limiting bundle of rays incident on the periphery of the most object side lens in the first lens group being disposed, and the following conditional expression is satisfied:

$$0.05 < \{L \times (\Delta ht/ft)\}/(\Phi 1 - \Phi 0) < 2.00$$

where $\Phi0$ denotes an effective diameter of the most object side lens in the first lens group of the high zoom ratio zoom lens system, $\Phi1$ denotes a diameter of the aperture portion in the shield member, $\Delta ht$ denotes the maximum moving amount of the solid-state imaging device in the telephoto end state, ft denotes a focal length of the high zoom ratio zoom lens system in the telephoto end state, and L denotes a total lens length of the high zoom ratio zoom lens system in the wide-angle end state.

According to the present invention, it becomes possible to provide an imaging apparatus, an imaging method, and a high zoom ratio zoom lens system carrying out vibration reduction by moving a solid-state imaging device in a direction substantially perpendicular to an optical axis, capable of efficiently using effective pixels of the solid-state imaging device, and capable of securing an excellent peripheral light quantity ratio of an object image even upon carrying out vibration reduction.

BRIEF DESCRIPTION OF THE DRAWINGS

FIGS. 5A, 5B and 5C are graphs showing light amount distribution on the object image in the wide-angle end state upon focusing on infinity in Example 1, in which FIG. 5A shows without vibration reduction ($\Phi1-\Phi0=2.0$ mm), FIG. 5B shows upon carrying out maximum vibration reduction ($\Phi1-\Phi-0=0.0$ mm), and FIG. 5C shows upon carrying out maximum vibration reduction ($\Phi1-\Phi0=2.0$ mm).

FIGS. 6A, 6B and 6C are graphs showing various aberrations of the high zoom ratio zoom lens system according to Example 1 upon focusing on infinity, in which FIG. 2A is in a wide-angle end state, FIG. 2B is in an intermediate focal length state, and FIG. 2C is in a telephoto end state.

FIGS. 7A, 7B and 7C are graphs showing various aberrations of the high zoom ratio zoom lens system according to Example 1 upon focusing on a close object, in which FIG. 7A is in the wide-angle end state (Rw=300 mm), FIG. 7B is in the intermediate focal length state (Rm=300 mm), and FIG. 7C is in the telephoto end state (Rt=1000 mm).

FIGS. 9A, 9B and 9C are graphs showing light amount distribution on the object image in the wide-angle end state upon focusing on infinity in Example 2, in which FIG. 9A shows without vibration reduction ($\Phi1-\Phi0=0.4$ mm), FIG. 9B shows upon carrying out maximum vibration reduction ($\Phi1-\Phi0=0.0$ mm), and FIG. 9C shows upon carrying out maximum vibration reduction ($\Phi1-\Phi0=0.4$ mm).

FIGS. 10A, 10B and 10C are graphs showing various aberrations of the high zoom ratio zoom lens system according to Example 2 upon focusing on infinity, in which FIG. 10A is in a wide-angle end state, FIG. 10B is in an intermediate focal length state, and FIG. 10C is in a telephoto end state.

FIGS. 11A, 11B and 11C are graphs showing various aberrations of the high zoom ratio zoom lens system according to Example 2 upon focusing on a close object, in which FIG. 11A is in the wide-angle end state (Rw=300 mm), FIG. 11B is in the intermediate focal length state (Rm=300 mm), and FIG. 11C is in the telephoto end state (Rt=1000 mm).

THE BEST MODE FOR CARRYING OUT THE INVENTION

Figure 1:
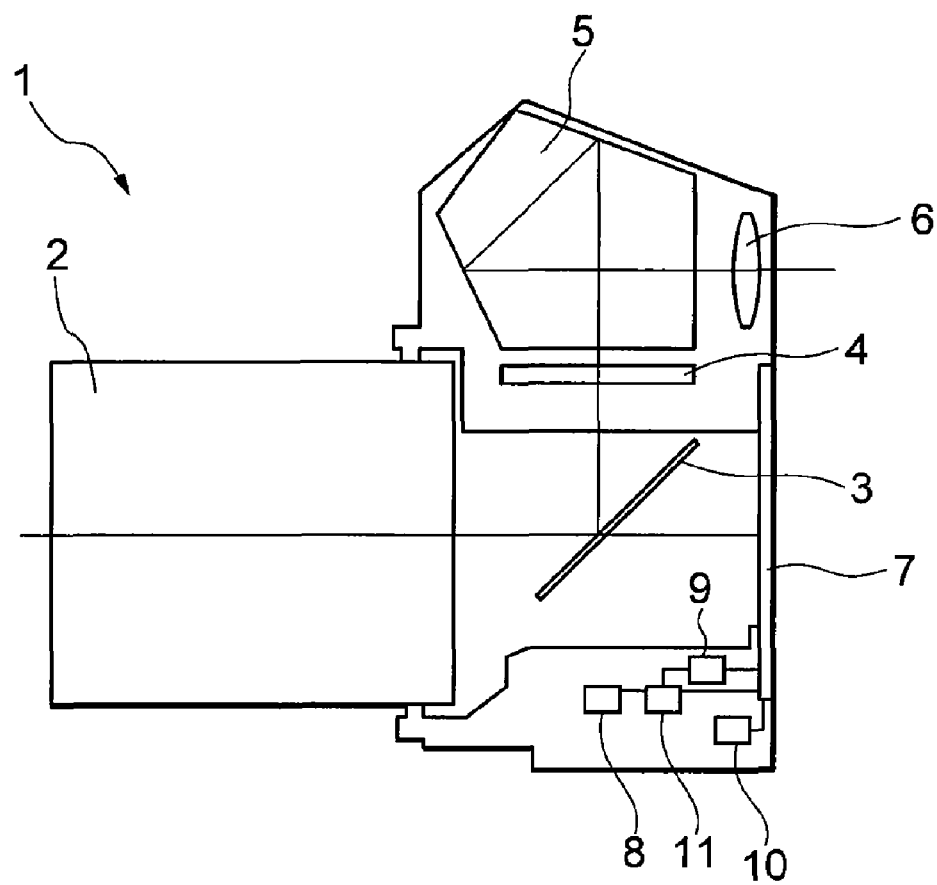
FIG. 1 is a diagram showing an imaging apparatus according to Example 1 of the present application.

An imaging apparatus, an imaging method, and a high zoom ratio zoom lens system according to the present application are explained below with reference to accompanying drawings.

An imaging apparatus according to the present application including: a high zoom ratio zoom lens system comprising, in order from an object, a first lens group having positive refractive power, a second lens group having negative refractive power, a third lens group, a fourth lens group, and a fifth lens group, upon zooming from a wide-angle end state to a telephoto end state, the first lens group, the second lens group, the third lens group, and the fourth lens group being moved along an optical axis; a solid-state imaging device capturing an object image formed by the high zoom ratio zoom lens system; a detecting member that detects variation in a position of the object image; a driving member that moves the solid-state imaging device in a direction substantially perpendicular to the optical axis; a control member that controls the driving member in order to correct variation in the position of the object image; and a shield member with an aperture portion for limiting bundle of rays incident on the periphery of the most object side lens in the first lens group of the high zoom ratio zoom lens system; and the following conditional expression (1) being satisfied:

$$0.05 < \{L \times (\Delta ht/ft)\}/(\Phi1-\Phi0) < 2.00 \tag{1}$$

where $\Phi0$ denotes an effective diameter of the most object side lens in the first lens group of the high zoom ratio zoom lens system, $\Phi1$ denotes a diameter of the aperture portion in the shield member, $\Delta ht$ denotes the maximum moving amount of the solid-state imaging device in the telephoto end state, ft denotes a focal length of the high zoom ratio zoom lens system in the telephoto end state, and L denotes a total lens length of the high zoom ratio zoom lens system in the wide-angle end state.

With making refractive power of the third lens group positive, that of the fourth lens group positive, and that of the fifth lens group positive, it becomes possible to further secure the effect of the present application.

Conditional expression (1) defines the diameter of the aperture portion in the shield member.

When the value $\{L \times (\Delta ht/ft)\}/(\Phi1-\Phi0)$ is equal to or falls below the lower limit of conditional expression (1), coma on the periphery of the image becomes large, so that it is undesirable. In order to secure the effect of the present application, it is preferable to set the lower limit of conditional expression (1) to 0.15.

On the other hand, when the value $\{L \times (\Delta ht/ft)\}/(\Phi1-\Phi0)$ is equal to or exceeds the upper limit of conditional expression (1), light quantity on the periphery of the image becomes uneven, so that it is undesirable. Moreover, when the maximum moving amount (a vibration reduction correction amount) of the solid-state imaging device in the telephoto end state is maximum, variation in the image plane becomes large, and variation in curvature of field is generated, so that it is undesirable. In order to further secure the effect of the present application, it is preferable to set the upper limit of conditional expression (1) to 1.50.

In an imaging apparatus according to the present application, the aperture portion of the shield member is preferably an aperture having a circular shape.

With this construction, since the aperture portion has a rotational symmetry centered on the optical axis, desired shield effect can be obtained without performing rotational adjustment. Incidentally, the inner diameter of the aperture portion having a circular shape becomes $\Phi 1$ in conditional expression (1).

In an imaging apparatus according to the present application, the aperture portion of the shield member is preferably an aperture having a rectangular shape corresponding to the solid-state imaging device.

With this construction, it becomes possible to set the shape of the aperture portion of the shield member to be an external shape of effective pixels of the solid-state imaging device projected on the most object side lens surface in the first lens group. Accordingly, it becomes possible to effectively prevent stray light from entering into the high zoom ratio zoom lens system. The diagonal length of the aperture portion having a rectangular shape becomes $\Phi 1$ in conditional expression (1).

In an imaging apparatus according to the present application, the following conditional expression (2) is preferably satisfied:

$$0.10 < (fw \times \Delta ht)/(ft \times \Delta hw) \leq 1.0 \quad (2)$$

where fw denotes a focal length of the high zoom ratio zoom lens system in the wide-angle end state, ft denotes a focal length of the high zoom ratio zoom lens system in the telephoto end state, and $\Delta ht$ denotes the maximum moving amount of the solid-state imaging device in the telephoto end state.

Conditional expression (2) defines an appropriate range of the maximum moving amount of the solid-state imaging device and a focal length of the high zoom ratio zoom lens system.

When the value $(fw \times \Delta ht)/(ft \times \Delta hw)$ exceeds the upper limit of conditional expression (2), variation in the image plane becomes large in the case when the maximum moving amount of the solid-state imaging device become maximum. Moreover, variation in curvature of field is generated, so that it is undesirable. In order to secure the effect of the present application, it is preferable to set the upper limit of conditional expression (2) to 0.9.

On the other hand, when the value $(fw \times \Delta ht)/(ft \times \Delta hw)$ is equal to or falls below the lower limit of conditional expression (2), the effective diameter of the most object side lens in the first lens group becomes too large, so that it is undesirable. In order to keep the effective diameter small, refractive power of the third lens group has to be large. As a result, coma becomes large, so that it is undesirable. In order to secure the effect of the present application, it is preferable to set the lower limit of conditional expression (2) to 0.2.

In an imaging apparatus according to the present application, it is preferable that the shield member is made up by applying shielding paint on the most object side lens surface of the first lens group.

As described above, with making up the shield member by applying shielding paint on the outer periphery of the most object side lens surface of the first lens group, it becomes possible to make the diameter of the aperture portion of the shield member small. Moreover, it becomes possible to make the number of assembly parts of the high zoom ratio zoom lens system fewer, so that cost reduction can be attained.

In an imaging apparatus according to the present application, the shield member is preferably a plate-like member disposed on the most object side lens surface of the first lens group of the high zoom ratio zoom lens system.

With this construction, it becomes possible to make the diameter of the aperture portion of the shield member small. The above-described plate-like member includes a thin sheet member.

In an imaging apparatus according to the present application, the shield member is preferably formed in a body with a lens-fixing member for fixing the most object side lens of the first lens group in the high zoom ratio zoom lens system.

With this construction, since an annular fixing member for being screwed and fixing the most object side lens of the first lens group into a lens barrel can be used as the shield member, the number of assembly parts can be fewer, so that the high zoom ratio zoom lens system can be simplified.

In an imaging apparatus according to the present application, the high zoom ratio zoom lens system preferably carries out focusing by moving the fifth lens group along the optical axis.

In this manner, with such configuration that focusing is carried out by the fifth lens group, which is fixed upon zooming, driving mechanism can be simplified.

In an imaging apparatus according to the present application, in order to keep excellent aberration correction state with reducing the diameter of the shield member, the fourth lens group of the high zoom ratio zoom lens system is preferably composed of, in order from the object, a front group having positive refractive power, and a rear group having negative refractive power, and the following conditional expression (3) is preferably satisfied:

$$-0.45 < (f4F + f4R)/f4 < -0.20 \quad (3)$$

where f4 denotes a focal length of the fourth lens group in the high zoom ratio zoom lens system, f4F denotes a focal length of the front group of the fourth lens group in the high zoom ratio zoom lens system, and f4R denotes a focal length of the rear group of the fourth lens group in the high zoom ratio zoom lens system.

Conditional expression (3) defines an appropriate range of the focal lengths of the front group and rear group of the fourth lens group.

When the value (f4F+f4R)/f4 is equal to or exceeds the upper limit of conditional expression (3), inner coma is generated in an intermediate focal length state, so that it is undesirable. In order to secure the effect of the present application and to excellently suppress generation of inner coma in the intermediate focal length state, it is preferable to set the upper limit of conditional expression (3) to −0.25.

On the other hand, when the value (f4F+f4R)/f4 is equal to or falls below the lower limit of conditional expression (3), the diameter of the aperture portion of the shield member becomes large, so that it is undesirable. In order to secure the effect of the present application, it is preferable to set the lower limit of conditional expression (3) to −0.40.

An imaging method for capturing an object image formed by a high zoom ratio zoom lens system by means of a solid-state imaging device with detecting variation in a position of the object image, and moving the solid-state imaging device in a direction substantially perpendicular to the optical axis so as to correct variation in the position of the object image, the imaging method comprising steps of: providing the high zoom ratio zoom lens comprising, in order from the object, a first lens group having positive refractive power, a second lens group having negative refractive power, a third lens group, a fourth lens group, and a fifth lens group, upon zooming from a wide-angle end state to a telephoto end state, the first lens group, the second lens group, the third lens group, and the fourth lens group being moved along the optical axis; limiting bundle of rays incident on the periphery of the most object side lens in the first lens group of the high zoom ratio zoom lens system by a shield member with an aperture portion; and satisfying the following conditional expression:

$$0.05<\{L\times(\Delta ht/ft)\}/(\Phi 1-\Phi 0)<2.00$$

where $\Phi 0$ denotes an effective diameter of the most object side lens in the first lens group of the high zoom ratio zoom lens system, $\Phi 1$ denotes a diameter of the aperture portion in the shield member, $\Delta ht$ denotes the maximum moving amount of the solid-state imaging device in the telephoto end state, ft denotes a focal length of the high zoom ratio zoom lens system in the telephoto end state, and L denotes a total lens length of the high zoom ratio zoom lens system in the wide-angle end state.

With this construction, it becomes possible to realize an imaging method carrying out vibration reduction by moving an imaging device in a direction substantially perpendicular to an optical axis, capable of efficiently using effective pixels of the solid-state imaging device, and capable of securing an excellent peripheral light quantity ratio of a shot image even upon carrying out vibration reduction.

A high zoom ratio zoom lens system according to the present application that is used as an image-taking lens of an imaging apparatus having a configuration that upon capturing an object image formed by the image-taking lens by means of a solid-state imaging device, variation in a position of the object image is detected, and in order to correct variation in the position of the object image the solid-state imaging device is moved in a direction substantially perpendicular to an optical axis, the high zoom ratio zoom lens system comprising, in order from the object: a first lens group having positive refractive power; a second lens group having negative refractive power; a third lens group; a fourth lens group; and a fifth lens group, upon zooming from a wide-angle end state to a telephoto end state, the first lens group, the second lens group, the third lens group and the fourth lens group being moved along the optical axis, a shield member with an aperture portion for limiting bundle of rays incident on the periphery of the most object side lens in the first lens group being disposed, and the following conditional expression (1) being satisfied:

$$0.05<\{L\times(\Delta ht/ft)\}/(\Phi 1-\Phi 0)<2.00 \qquad (1)$$

where $\Phi 0$ denotes an effective diameter of the most object side lens in the first lens group of the high zoom ratio zoom lens system, $\Phi 1$ denotes a diameter of the aperture portion in the shield member, $\Delta ht$ denotes the maximum moving amount of the solid-state imaging device in the telephoto end state, ft denotes a focal length of the high zoom ratio zoom lens system in the telephoto end state, and L denotes a total lens length of the high zoom ratio zoom lens system in the wide-angle end state.

With this construction, it becomes possible to realize a high zoom ratio zoom lens system carrying out vibration reduction by moving an imaging device in a direction substantially perpendicular to an optical axis, capable of efficiently using effective pixels of the solid-state imaging device, and capable of securing an excellent peripheral light quantity ratio of a shot image even upon carrying out vibration reduction.

An imaging apparatus according to the present application is explained below with reference to accompanying drawings.

Example 1

FIG. 1 is a diagram showing an imaging apparatus according to Example 1 of the present application.

As shown in FIG. 1, the imaging apparatus 1 is a single-lens reflex digital camera equipped with a high zoom ratio zoom lens system explained later as an image-taking lens.

In the imaging apparatus 1, light emitted from an object (not shown) is converged by a high zoom ratio zoom lens system 2, and focused on a focusing screen 4 through a quick return mirror 3. The object image focused on the focusing screen 4 is reflected a plurality of times by a pentagonal roof prism 5, and led to an eyepiece 6. Therefore, a photographer can observe the object image as an erected image through the eyepiece 6.

When the photographer presses a shutter release button (not shown), the quick return mirror 3 is removed from an optical path, and the light from the object (not shown) reaches a solid-state imaging device 7. Accordingly, light from the object is captured by the solid-state imaging device 7 and stored in a memory 8 as an object image. In this manner, the photographer can take a picture of the object by the imaging apparatus 1.

In addition to the above-described solid-state imaging device 7 for capturing the object image formed by the high zoom ratio zoom lens system 2, the imaging apparatus 1 includes a camera-shake detector 9 for detecting an image blur, in other words, variation in the position of the object image caused by a camera shake of a user of the imaging apparatus 1, a driver 10 for moving the solid-state imaging device 7 in a direction substantially perpendicular to the optical axis, and a controller 11 for controlling each member of the imaging apparatus 1 such as the driver 10 so as to correcting variation in the position of the object image.

In the imaging apparatus 1 described above, at first variation in the position of the object image is detected by the camera-shake detector 9. Then, the controller 11 controls the driver 10 on the basis of the detected signal of the camera-shake detector 9 to move the solid-state imaging device 7 in a direction substantially perpendicular to the optical axis. Accordingly, variation in the position of the object image can be corrected. In this manner, vibration reduction of the imaging apparatus 1 is realized, and a failure in shooting caused by a camera shake can be prevented.

Then, a high zoom ratio zoom lens system, which is the most specific feature of Example 1, is explained.

Figure 2:
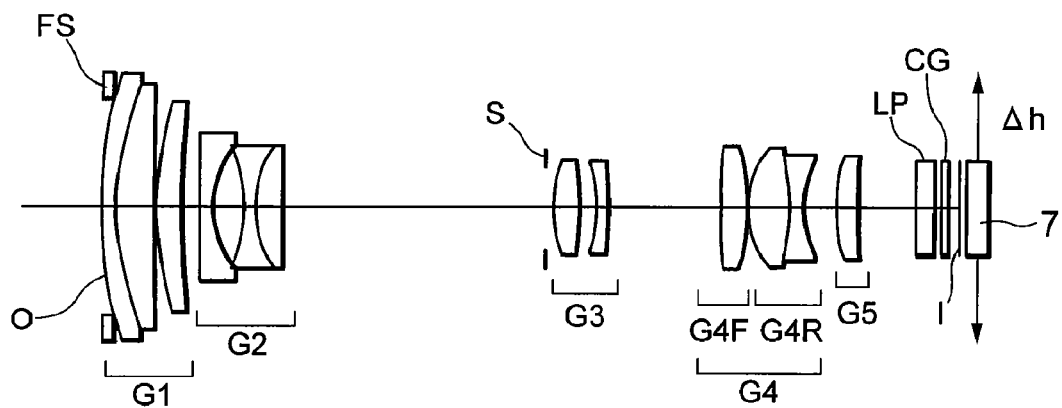
FIG. 2 is a diagram showing lens configuration of a high zoom ratio zoom lens system attached to the imaging apparatus according to Example 1 together with a movement of an imaging device.

FIG. 2 is a diagram showing lens configuration of a high zoom ratio zoom lens system attached to the imaging apparatus according to Example 1 together with a movement of an imaging device.

Figure 3:
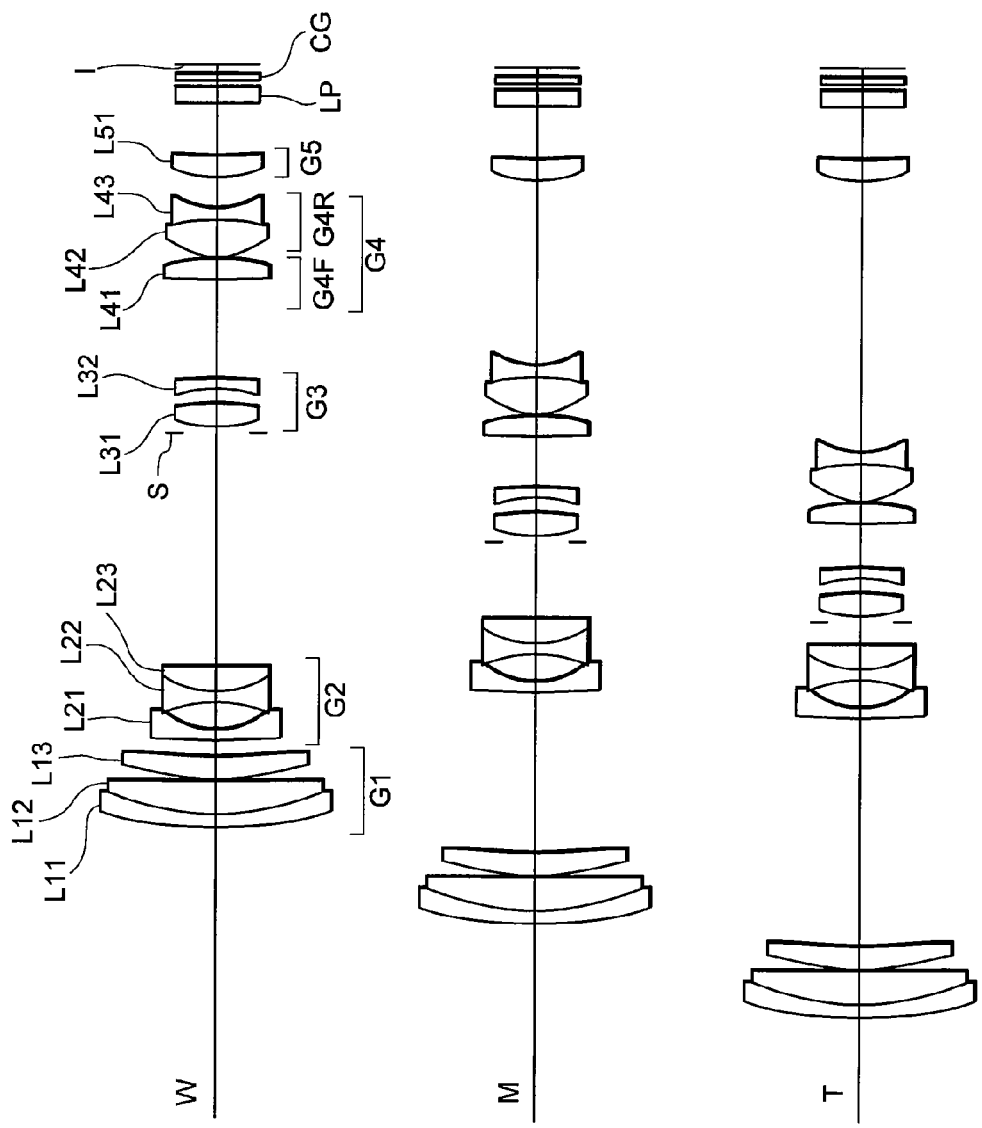
FIG. 3 is diagram showing the high zoom ratio zoom lens system attached to the imaging apparatus according to Example 1 upon focusing on infinity in a wide-angle end state W, in an intermediate focal length state M, and in a telephoto end state T.

FIG. 3 is diagram showing the high zoom ratio zoom lens system attached to the imaging apparatus according to Example 1 upon focusing on infinity in a wide-angle end state W, in an intermediate focal length state M, and in a telephoto end state T.

The high zoom ratio zoom lens system according to Example 1 is composed of, in order from an object, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, an optical low-pass filter LF, and a cover glass CG for the solid-state imaging device 7.

The first lens group G1 is composed of, in order from the object, a cemented positive lens constructed by a negative meniscus lens L11 having a convex surface facing the object cemented with a positive meniscus lens L12 having a convex surface facing the object, and a positive meniscus lens L13 having a convex surface facing the object.

The second lens group G2 is composed of, in order from the object, a negative meniscus lens L21 having a convex surface facing the object, and a cemented negative lens constructed by a double concave negative lens L22 cemented with a double convex positive lens L23.

The third lens group G3 is composed of, in order from the object, a double convex positive lens L31, and a negative meniscus lens L32 having a concave surface facing the object.

The fourth lens group G4 is composed of, in order from the object, a front group G4F having positive refractive power, and a rear group G4R having negative refractive power. The front group G4F is composed of a double convex positive lens L41 having an aspherical surface facing an image. The rear group G4R is composed of a cemented negative lens constructed by, in order from the object, a double convex positive lens L42 cemented with a double concave negative lens L43.

The fifth lens group G5 is composed of a positive meniscus lens L51 having a convex surface facing the object.

In a high zoom ratio zoom lens system according to Example 1, upon zooming from a wide-angle end state to a telephoto end state, the first lens group G1 is moved to the object, the second lens group G2 is moved at first to the image and then to the object which has a zoom trajectory with a concave shape facing the object, the third lens group G3 is moved to the object, and the fourth lens group G4 is moved to the object. On this occasion, the aperture stop S is moved in a body with the third lens group G3.

In a high zoom ratio zoom lens system according to Example 1, upon focusing from infinity to a close object, the fifth lens group that is fixed upon zooming is moved to the object.

In a high zoom ratio zoom lens system having such construction, a shield member FS having a circular aperture portion O is disposed in the vicinity of the object side lens surface of the negative meniscus lens L11, which is the most object side lens in the first lens group G1, in order to shield unnecessary bundle of rays incident on the periphery of the lens surface.

In the aperture portion O of the shield member FS, the inner diameter $\Phi 1$ is larger than the effective diameter $\Phi 0$ of the negative meniscus lens L11, and the above-described conditional expression (1) is satisfied. With this configuration, it becomes possible to excellently secure peripheral light quantity ratio of the object image with shielding unnecessary bundle of rays incident on the periphery of the lens surface even upon carrying out vibration reduction in the imaging apparatus 1 by moving the solid-state imaging device 7 in a direction substantially perpendicular to the optical axis.

Figure 4A:
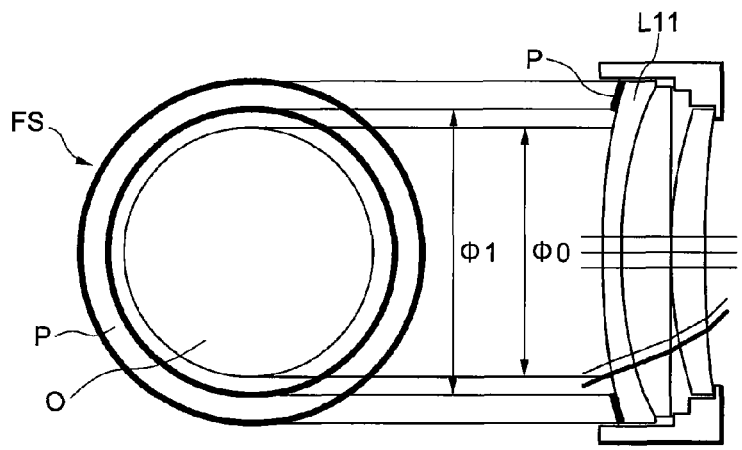
FIGS. 4A, 4B and 4C are diagrams each showing specific configuration of a shading member of the imaging apparatus according to Example 1.
Figure 4B:
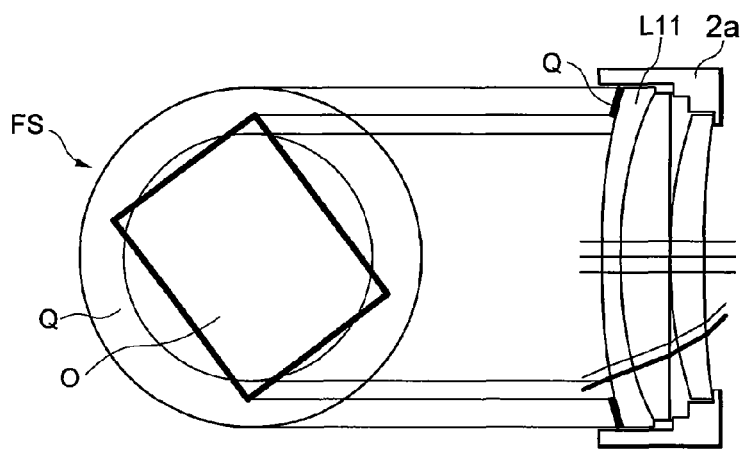
Figure 4C:
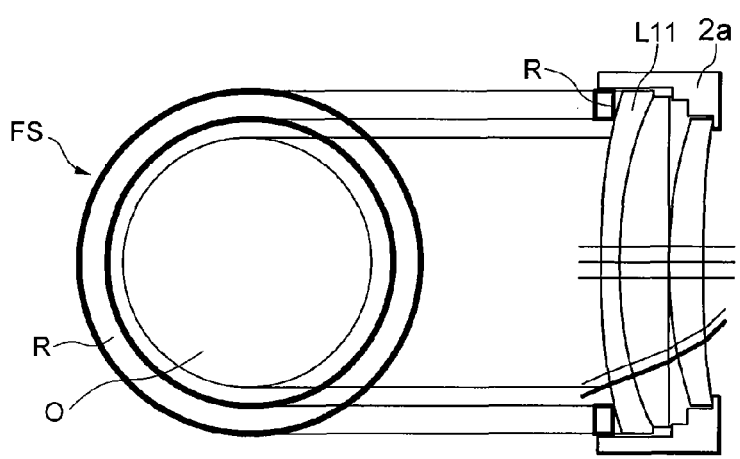

FIGS. 4A, 4B and 4C are diagrams each showing specific configuration of a shading member of the imaging apparatus according to Example 1.

As shown in FIG. 4A, the shield member FS according to Example 1 is constructed by applying shield paint P on the periphery of the object side surface of the negative meniscus lens L11 forming a circular aperture portion O having an inner diameter $\Phi 1$.

Here, a shield member FS according to the present application is not limited to this, any other configurations as shown in FIGS. 4B and 4C may be used.

Moreover, as shown in FIG. 4B, a plate-like shield member Q having an aperture portion with rectangular shape projecting an external shape of effective pixels of the solid-state imaging device 7 onto the object side lens surface of the negative meniscus lens L11 may be disposed as the shield member FS in such a manner that the shield member Q is disposed inside of the lens barrel 2a holding the high zoom ratio zoom lens system, and comes in contact with the lens surface. With this configuration, it becomes possible to effectively prevent stray light from entering into the high zoom ratio zoom lens system.

Furthermore, in Example 1, as shown in FIG. 4C, when the inner diameter of an annular member R, such as a so-called retaining ring, which is screwed and fixed into the lens barrel 2a so as to fix the position of the negative meniscus lens L11 in a direction of the optical axis is made to be $\Phi 1$, it becomes possible to make the annular member R function as a shield member FS. Such an annular member R having a high retaining ability is suitable for a large diameter lens.

Then, specific numerical data of a high zoom ratio zoom lens system according to Example 1 are shown below.

Various values associated with a high zoom ratio zoom lens system according to Example 1 are listed in Table 1.

In [Specifications], f denotes a focal length, FNO denotes an f-number, $\Phi 0$ denoted an effective diameter of the negative meniscus lens L11, $\Phi 1$ denotes an inner diameter of the aperture portion O of the shield member FS, which is the maximum effective diameter of the negative meniscus lens L11 upon carrying out vibration reduction, IH denotes a diagonal length of the solid-state imaging device from the center to a corner, L denotes a total lens length of the high zoom ratio zoom lens system in a wide-angle end state, Δhw denotes the maximum moving amount of the solid-state imaging device 7 in the wide-angle end state, Δht denotes the maximum moving amount of the solid-state imaging device 7 in the telephoto end state.

In [Lens Data], "surface" shows the lens surface number counted in order from the object side, "r" shows a radius of curvature, "d" shows a distance to the next surface, "vd" shows Abbe number at d-line (wavelength λ=587.6 nm), and "nd" shows refractive index at d-line (wavelength λ=587.6 nm). Moreover, r=0.0000 denotes a plane surface, and Bf denotes back focal length. Refractive index of the air nd=1.000000 is omitted.

In [Aspherical Data], "E-n" denotes "×10$^{-n}$". A rotationally symmetrical aspherical surface is exhibited by the following expression:

$$X(y)=(y^2/r)/[1+[1-\kappa(y^2/r^2)]^{1/2}]+C4 \times y^4+C6 \times y^6+C8 \times y^8+C10 \times y^{10}+C12 \times y^{12}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere, κ denotes a conical coefficient, Cn denotes an aspherical coefficient of n-th order, and an aspherical coefficient whose value is 0 is omitted.

In [Variable Distances], f denotes a focal length, β denotes an imaging magnification, D0 denotes a distance between an object and the object side surface of the negative meniscus lens L11 in the first lens group G1 (a photo-taking distance), Bf denotes a back focal length, and TL denotes a total lens length.

In the tables for various values, "mm" is generally used for the unit of length such as the focal length, the radius of curvature and the like. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

[Specifications]

|   | W | T |
|---|---|---|
| f = | 6.36 | 60.00 |
| FNO = | 2.6 | 5.4 |
| Φ0 = 22.0 | | |
| Φ1 = 24.0 | | |
| IH = 3.52 | | |
| L = 74.1 | | |
| Δhw = 0.150 | | |
| Δht = 0.314 | | |

[Lens Data]

| surface | r | d | νd | nd |
|---|---|---|---|---|
| 1) | 49.9711 | 1.2000 | 23.78 | 1.846660 |
| 2) | 29.4301 | 3.3000 | 55.53 | 1.696797 |
| 3) | 5378.9855 | 0.1000 | | |
| 4) | 33.8916 | 2.3000 | 82.56 | 1.497820 |
| 5) | 117.7111 | (d5) | | |
| 6) | 411.5528 | 1.0000 | 40.76 | 1.882997 |
| 7) | 9.1748 | 2.8000 | | |
| 8) | −14.4058 | 1.0000 | 61.14 | 1.589130 |
| 9) | 10.8161 | 2.3000 | 22.76 | 1.808095 |
| 10) | −352.1299 | (d10) | | |
| 11) | 0.0000 | 0.5000 | Aperture Stop S | |
| 12) | 14.2018 | 2.3000 | 60.67 | 1.563839 |
| 13) | −19.3736 | 1.4000 | | |
| 14) | −12.1858 | 1.0000 | 23.78 | 1.846660 |
| 15) | −32.4283 | (d15) | | |
| 16) | 103.3476 | 2.2000 | 40.87 | 1.804320 |
| 17) | −16.9719 | 0.1000 | | |
| 18) | 8.5267 | 3.6000 | 82.56 | 1.497820 |
| 19) | −17.5207 | 1.1000 | 40.76 | 1.882997 |
| 20) | 9.6921 | (d20) | | |
| 21) | 14.2621 | 1.9000 | 48.84 | 1.531717 |
| 22) | 75.3615 | (d22) | | |
| 23) | 0.0000 | 1.6000 | 70.51 | 1.544370 |
| 24) | 0.0000 | 0.5000 | | |
| 25) | 0.0000 | 0.5000 | 64.10 | 1.516800 |
| 26) | 0.0000 | Bf | | |

[Aspherical Data]

Surface Number: 17
κ = −0.1290
C4 = 0.00000E+00
C6 = −1.77080E−07
C8 = 1.51460E−09

[Variable Distances]

|   | W | M | T |
|---|---|---|---|
| (Upon focusing on infinity) | | | |
| f | 6.36000 | 28.00000 | 60.00000 |
| D0 | ∞ | ∞ | ∞ |
| d5 | 1.58729 | 15.69746 | 22.06330 |
| d10 | 22.98517 | 7.63292 | 2.74873 |
| d15 | 9.89944 | 5.01384 | 3.95498 |
| d20 | 2.90783 | 18.06457 | 26.11013 |
| d22 | 5.00000 | 5.00000 | 5.00000 |
| Bf | 1.02477 | 1.02477 | 1.02477 |
| TL | 74.10449 | 83.13355 | 91.60191 |

TABLE 1-continued

| (Upon focusing on close object) | | | |
|---|---|---|---|
| β | −0.02598 | −0.09576 | −0.05429 |
| D0 | 225.8955 | 216.8664 | 908.3982 |
| d5 | 1.58729 | 15.69746 | 22.06330 |
| d10 | 22.98517 | 7.63292 | 2.74873 |
| d15 | 9.89944 | 5.01384 | 3.95498 |
| d20 | 2.57693 | 13.52669 | 20.75771 |
| d22 | 5.33090 | 9.53788 | 10.35242 |
| Bf | 1.02477 | 1.02477 | 1.02477 |
| TL | 74.10449 | 83.13355 | 91.60191 |

[Values for Conditional Expressions]

(1): {L × (Δht/ft)}/(Φ1 − Φ0) = 0.19
(2): (fw × Δht)/(ft × Δhw) = 0.22
(3): (f4F + f4R)/f4 = −0.326

Figure 5A:
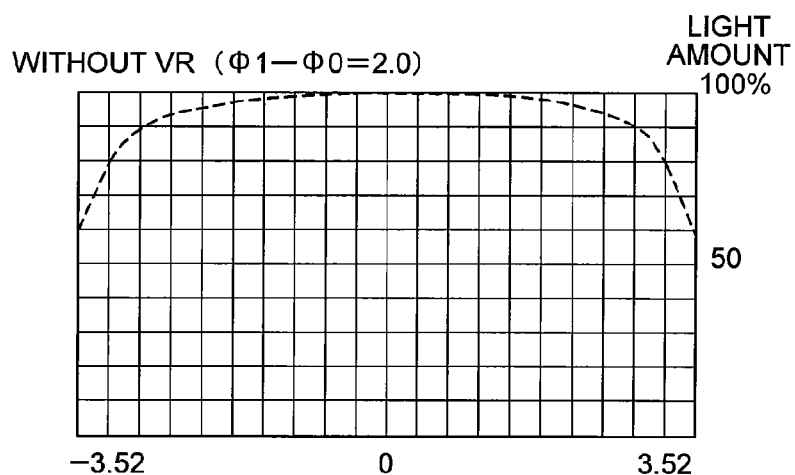
Figure 5B:
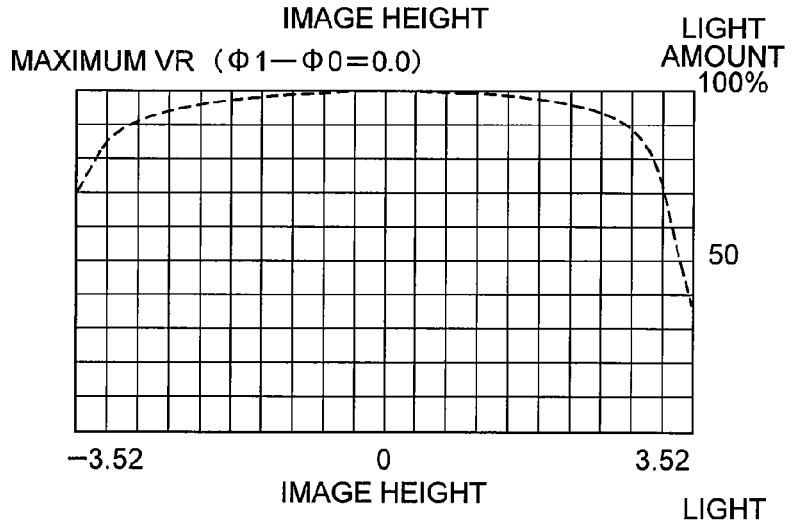
Figure 5C:
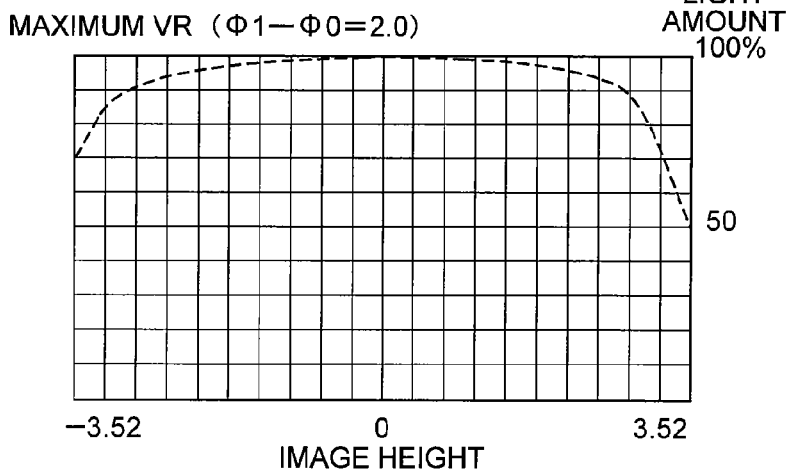

FIGS. 5A, 5B and 5C are graphs showing light amount distribution on the object image in the wide-angle end state upon focusing on infinity in Example 1, in which FIG. 5A shows without vibration reduction (Φ1−Φ0=2.0 mm), FIG. 5B shows upon carrying out maximum vibration reduction (Φ1−Φ0=0.0 mm), and FIG. 5C shows upon carrying out maximum vibration reduction (Φ1−Φ0=2.0 mm).

As is apparent from FIGS. 5A, 5B and 5C, when the value Φ1−Φ0 is kept relatively large value in the vicinity of the lower limit of conditional expression (1), light amount on the corner of the image frame becomes excellent.

Figure 6A:
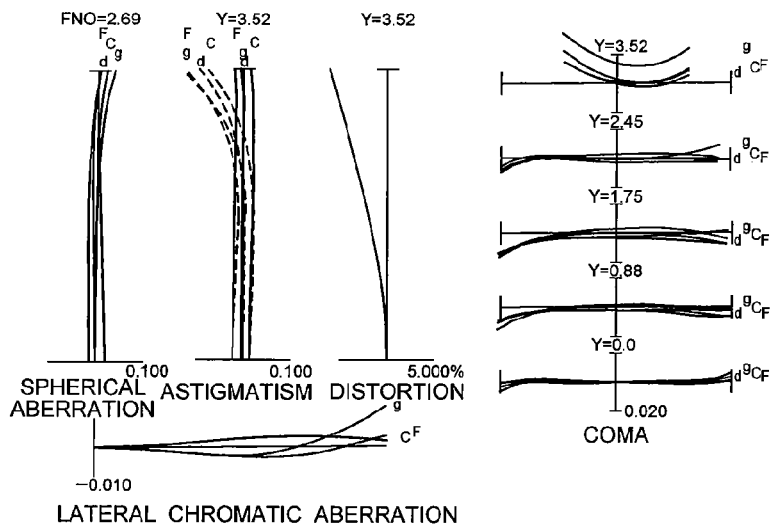
Figure 6B:
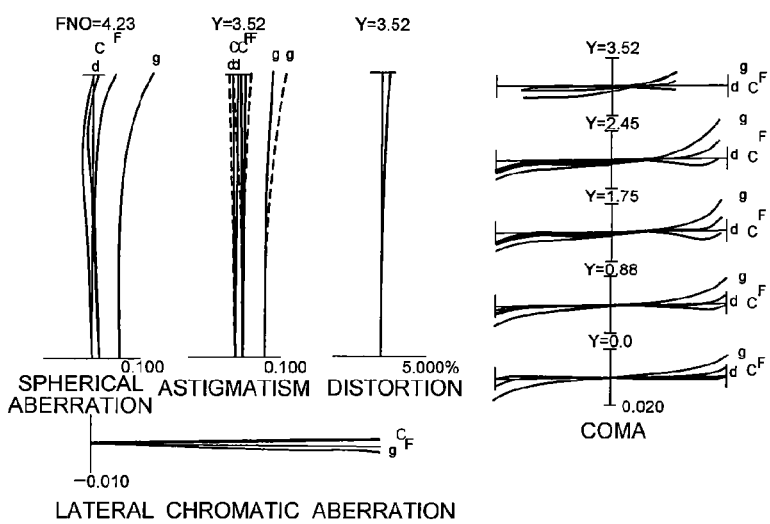
Figure 6C:
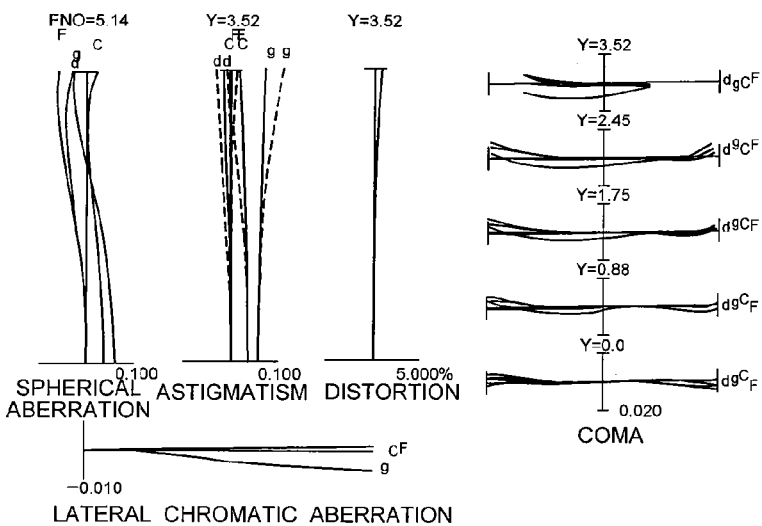

FIGS. 6A, 6B and 6C are graphs showing various aberrations of the high zoom ratio zoom lens system according to Example 1 upon focusing on infinity, in which FIG. 2A is in a wide-angle end state, FIG. 2B is in an intermediate focal length state, and FIG. 2C is in a telephoto end state.

Figure 7A:
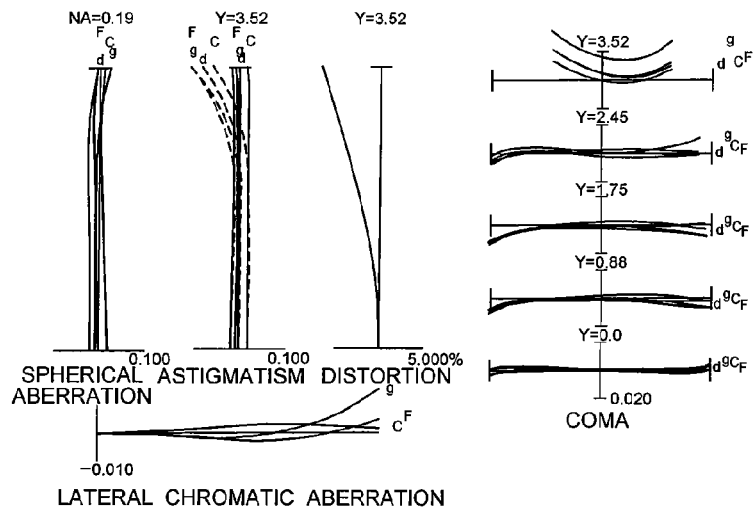
Figure 7B:
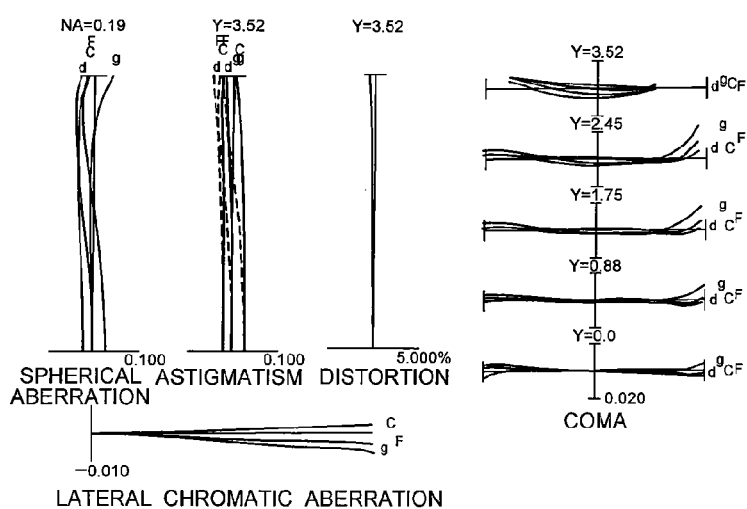
Figure 7C:
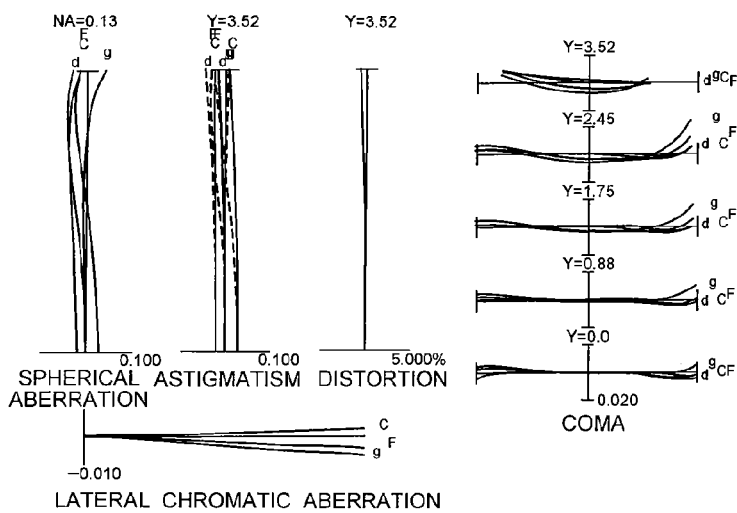

FIGS. 7A, 7B and 7C are graphs showing various aberrations of the high zoom ratio zoom lens system according to Example 1 upon focusing on a close object, in which FIG. 7A is in the wide-angle end state (Rw=300 mm), FIG. 7B is in the intermediate focal length state (Rm=300 mm), and FIG. 7C is in the telephoto end state (Rt=1000 mm).

In respective graphs, FNO denotes an f-number, NA denotes a numerical aperture, Y denotes an image height. In respective graphs, d denotes an aberration curve at d-line (wavelength λ=587.6 nm), g denotes an aberration curve at g-line (wavelength λ=435.8 nm), C denotes an aberration curve at C-line (wavelength λ=656.3 nm), and F denotes an aberration curve at F-line (wavelength λ=486.1 nm).

In graphs showing spherical aberration, an f-number or a numerical aperture with respect to the maximum aperture is shown. In graphs showing coma, coma with respect to each image height is shown. In the graph showing astigmatism, a solid line indicates a sagittal image plane, and a broken line indicates a meridional image plane. The above-described explanation regarding various aberration graphs is the same as the other Examples.

As is apparent from the respective graphs, the zoom lens system according to Example 1 shows superb optical performance as a result of good corrections to various aberrations in the wide-angle end state, in the intermediate focal length state, and in the telephoto end state upon focusing on infinity and on a close object.

Example 2

The basic configuration of an imaging apparatus according to Example 2 is the same as Example 1, so that the duplicated explanations are omitted, and a high zoom ratio zoom lens system according to Example 2, which has different configuration from that of Example 1, is precisely explained below.

Figure 8:
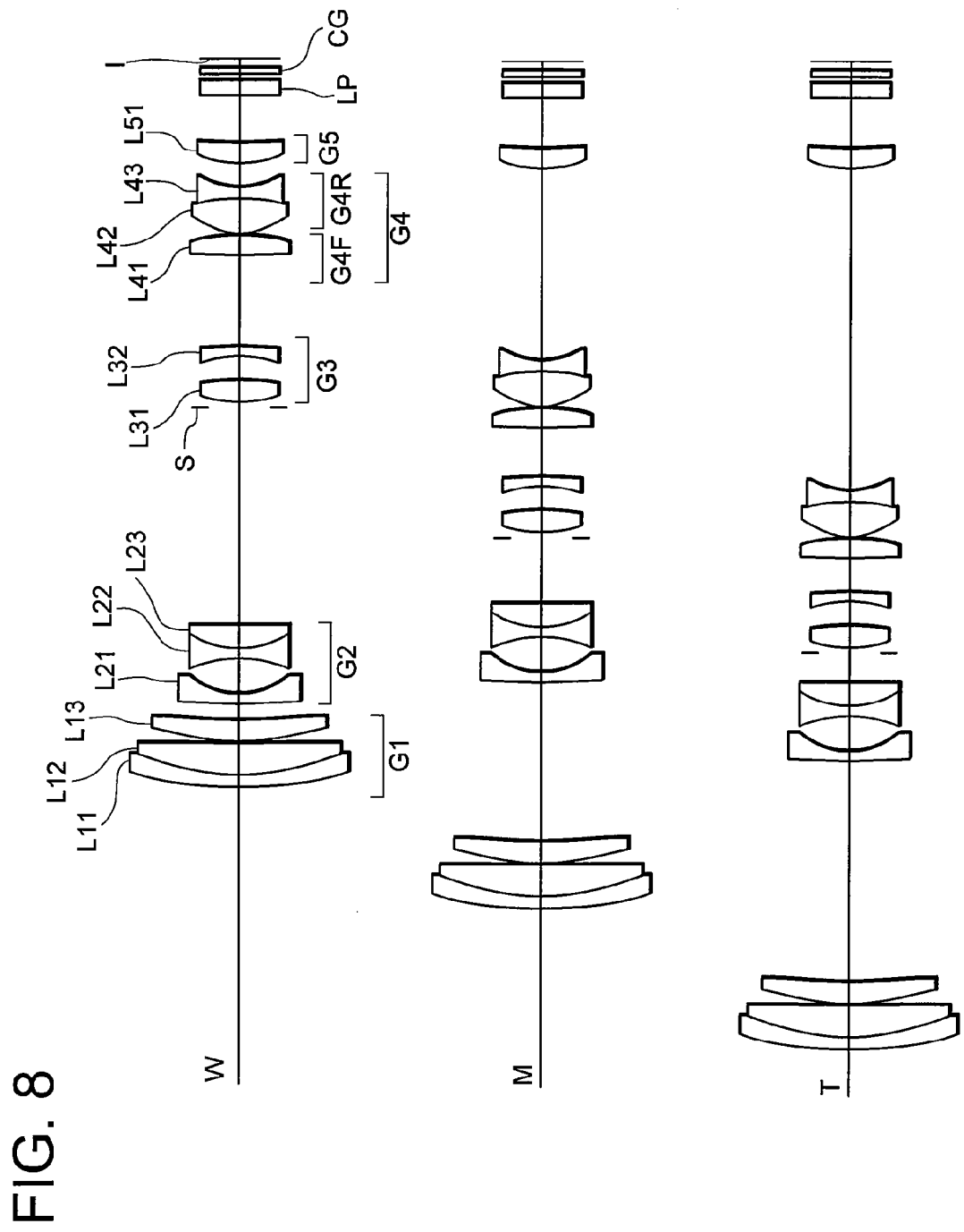
FIG. 8 is diagram showing the high zoom ratio zoom lens system attached to the imaging apparatus according to Example 2 upon focusing on infinity in a wide-angle end state W, in an intermediate focal length state M, and in a telephoto end state T.

FIG. 8 is diagram showing the high zoom ratio zoom lens system attached to the imaging apparatus according to Example 2 upon focusing on infinity in a wide-angle end state W, in an intermediate focal length state M, and in a telephoto end state T.

The high zoom ratio zoom lens system according to Example 2 is composed of, in order from an object, a first lens group G1 having positive refractive power, a second lens group G2 having negative refractive power, an aperture stop S, a third lens group G3 having positive refractive power, a fourth lens group G4 having positive refractive power, a fifth lens group having positive refractive power, an optical low-pass filter LF, and a cover glass CG for a solid-state imaging device 7.

The first lens group G1 is composed of, in order from the object, a cemented positive lens constructed by a negative meniscus lens L11 having a convex surface facing the object cemented with a positive meniscus lens L12 having a convex surface facing the object, and a positive meniscus lens L13 having a convex surface facing the object.

The second lens group G2 is composed of, in order from the object, a negative meniscus lens L21 having a convex surface facing the object, and a cemented negative lens constructed by a double concave negative lens L22 cemented with a positive meniscus lens L23 having a convex surface facing the object.

The third lens group G3 is composed of, in order from the object, a double convex positive lens L31, and a negative meniscus lens L32 having a concave surface facing the object.

The fourth lens group G4 is composed of, in order from the object, a front group G4F having positive refractive power, and a rear group G4R having negative refractive power. The front group G4F is composed of a double convex positive lens L41 having an aspherical surface facing the image. The rear group G4R is composed of a cemented negative lens constructed by, in order from the object, a double convex positive lens L42 cemented with a double concave negative lens L43.

The fifth lens group G5 is composed of a positive meniscus lens L51 having a convex surface facing the object.

In the high zoom ratio zoom lens system according to Example 2, upon zooming from a wide-angle end state to a telephoto end state, the first lens group G1 is moved to the object, the second lens group G2 is moved at first to the image and then to the object, which has a zoom trajectory having a concave shape facing the object, the third lens group G3 is moved to the object, and the fourth lens group G4 is moved to the object. On this occasion, the aperture stop S is moved in a body with the third lens group G3.

In the high zoom ratio zoom lens system according to Example 2, upon focusing from infinity to a close object, the fifth lens group G5 that is fixed upon zooming is move to the object.

Various values associated with the high zoom ratio zoom lens system according to Example 2 are listed in Table 2.

TABLE 2

[Specifications]

|  | W | T |
| --- | --- | --- |
| f = | 6.36 | 60.00 |
| FNO = | 2.7 | 5.9 |
| Φ0 = 21.8 | | |
| Φ1 = 22.2 | | |
| IH = 3.52 | | |

TABLE 2-continued

L = 75.3
Δhw = 0.040
Δht = 0.314

[Lens Data]

| surface | r | d | νd | nd |
| --- | --- | --- | --- | --- |
| 1) | 55.0652 | 1.2000 | 33.89 | 1.803840 |
| 2) | 23.7762 | 3.6000 | 55.53 | 1.696797 |
| 3) | 215.8744 | 0.1000 | | |
| 4) | 36.5812 | 2.3000 | 82.56 | 1.497820 |
| 5) | 2497.9174 | (d5) | | |
| 6) | 60.2908 | 1.2000 | 40.76 | 1.882997 |
| 7) | 8.5204 | 3.3000 | | |
| 8) | −12.7297 | 1.1000 | 64.10 | 1.516800 |
| 9) | 10.7779 | 2.4000 | 22.76 | 1.808095 |
| 10) | 135.4699 | (d10) | | |
| 11) | 0.0000 | 0.5000 | | Aperture Stop S |
| 12) | 14.1390 | 2.3000 | 82.52 | 1.497820 |
| 13) | −19.3654 | 2.6000 | | |
| 14) | −10.6233 | 1.1000 | 23.78 | 1.846660 |
| 15) | −19.0400 | (d15) | | |
| 16) | 68.4505 | 2.2000 | 40.87 | 1.804320 |
| 17) | −18.2949 | 0.1000 | | |
| 18) | 9.1400 | 3.6000 | 82.56 | 1.497820 |
| 19) | −19.6293 | 1.1000 | 40.76 | 1.882997 |
| 20) | 9.7796 | (d20) | | |
| 21) | 12.6808 | 1.9000 | 48.84 | 1.531717 |
| 22) | 48.0770 | (d22) | | |
| 23) | 0.0000 | 1.6000 | 70.51 | 1.544370 |
| 24) | 0.0000 | 0.5000 | | |
| 25) | 0.0000 | 0.5000 | 64.10 | 1.516800 |
| 26) | 0.0000 | Bf | | |

[Aspherical Data]

Surface Number: 8
κ = 1.4722
C4 = 0.00000E+00
C6 = −1.17080E−06
C8 = 5.18160E−09
Surface Number: 17
κ = −0.2417
C4 = 0.00000E+00
C6 = −8.07840E−08
C8 = 1.57540E−10

[Variable Distances]

|  | W | M | T |
| --- | --- | --- | --- |
| (Upon focusing on infinity) | | | |
| f | 6.36000 | 28.00000 | 60.00000 |
| D0 | ∞ | ∞ | ∞ |
| d5 | 1.53220 | 16.37499 | 22.66404 |
| d10 | 22.72841 | 7.26469 | 2.92108 |
| d15 | 9.23659 | 4.47495 | 3.24643 |
| d20 | 2.52172 | 20.12208 | 33.21485 |
| d22 | 5.20000 | 5.20000 | 5.20000 |
| Bf | 0.83352 | 0.83352 | 0.83352 |
| TL | 75.25244 | 87.47022 | 101.27992 |
| (Upon focusing on close object) | | | |
| β | −0.02607 | −0.09698 | −0.05408 |
| D0 | 224.7476 | 212.5298 | 898.7201 |
| d5 | 1.53220 | 16.37499 | 22.66404 |
| d10 | 22.72841 | 7.26469 | 2.92108 |
| d15 | 9.23659 | 4.47495 | 3.24643 |
| d20 | 2.20140 | 15.66133 | 28.02150 |
| d22 | 5.52032 | 9.66074 | 10.39335 |
| Bf | 0.83352 | 0.83352 | 0.83352 |
| TL | 75.25244 | 87.47022 | 101.27992 |

TABLE 2-continued

[Values for Conditional Expressions]

(1): {L × (Δht/ft)}/(Φ1 − Φ0) = 0.985
(2): (fw × Δht)/(ft × Δhw) = 0.84
(3): (f4F + f4R)/f4 = −0.26

Figure 9A:
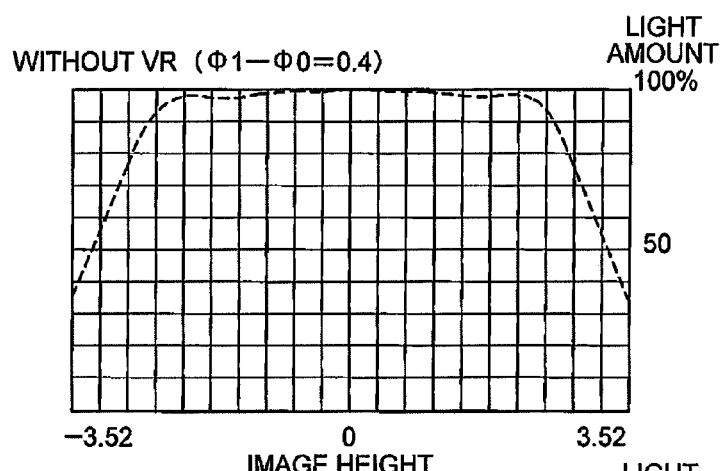
Figure 9B:
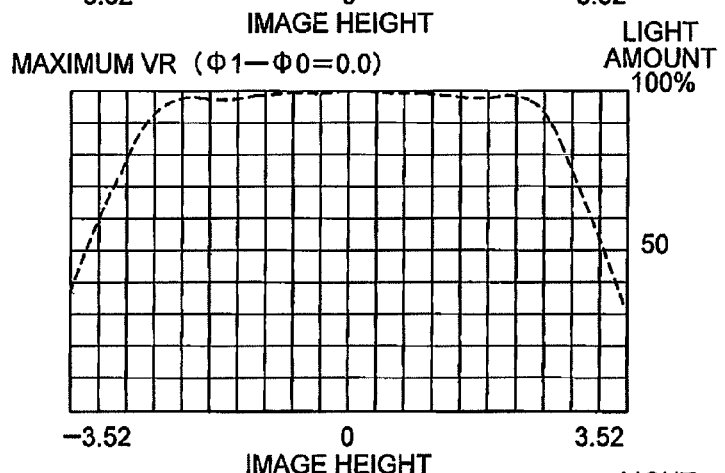
Figure 9C:
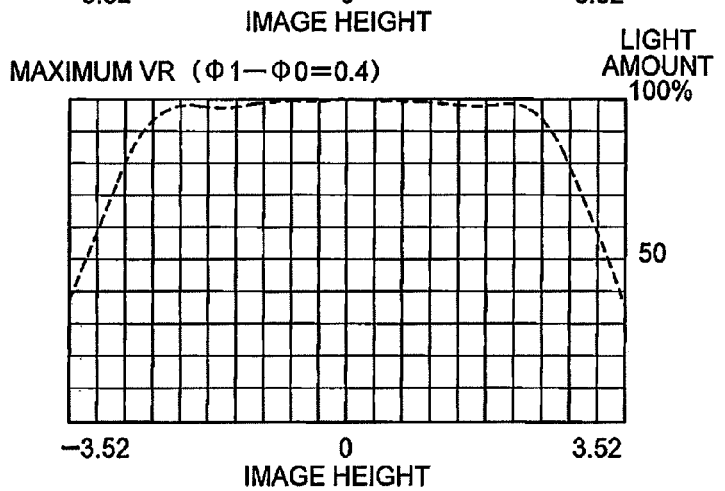

FIGS. 9A, 9B and 9C are graphs showing light amount distribution on the object image in the wide-angle end state upon focusing on infinity in Example 2, in which FIG. 9A shows without vibration reduction (Φ1−Φ0=0.4 mm), FIG. 9B shows upon carrying out maximum vibration reduction (Φ1−Φ0=0.0 mm), and FIG. 9C shows upon carrying out maximum vibration reduction (Φ1−Φ0=0.4 mm).

As shown in FIGS. 9A, 9B and 9C, even if the value Φ1−Φ0=0.0 mm in the vicinity of the upper limit of conditional expression (1), since variation in light amount ratio is small as shown in FIG. 9B, light amount on the corner of the image frame becomes excellent.

Figure 10A:
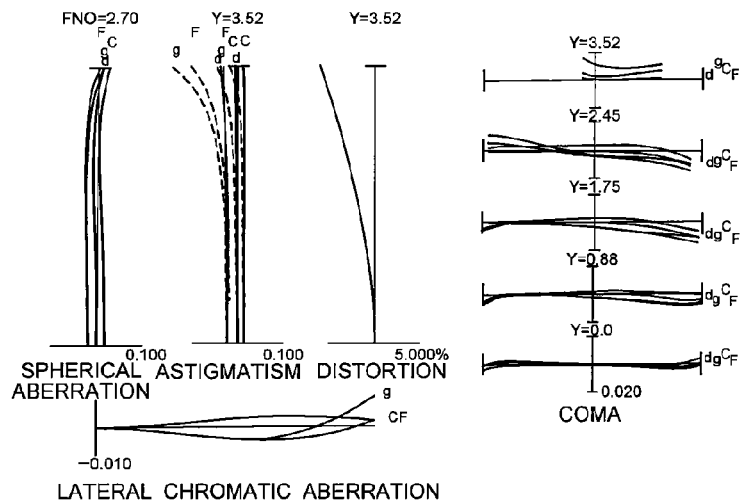
Figure 10B:
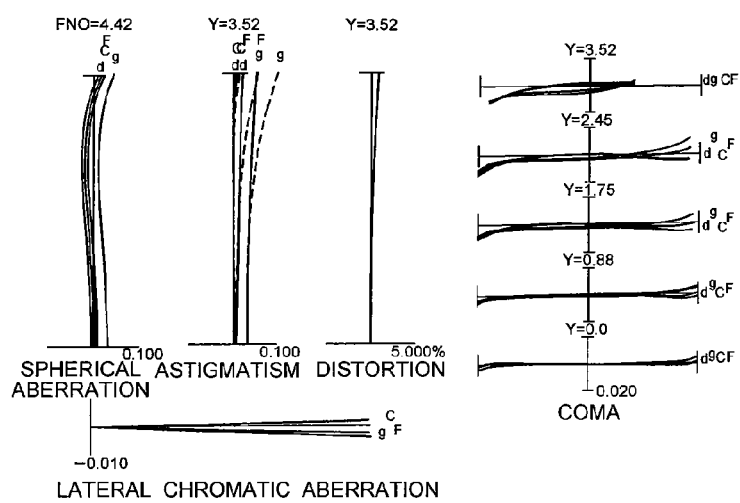
Figure 10C:
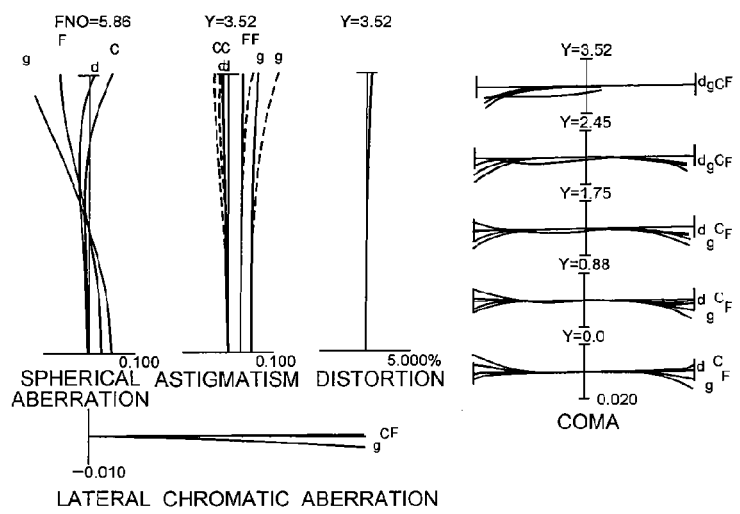

FIGS. 10A, 10B and 10C are graphs showing various aberrations of the high zoom ratio zoom lens system according to Example 2 upon focusing on infinity, in which FIG. 10A is in a wide-angle end state, FIG. 10B is in an intermediate focal length state, and FIG. 10C is in a telephoto end state.

Figure 11A:
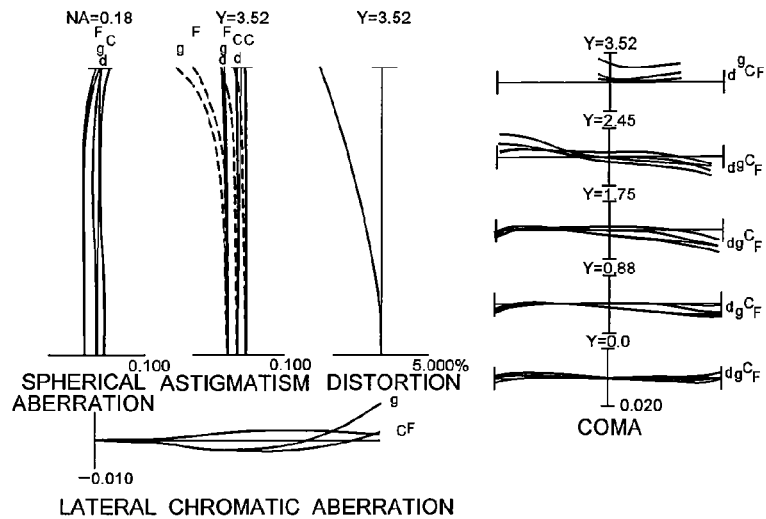
Figure 11B:
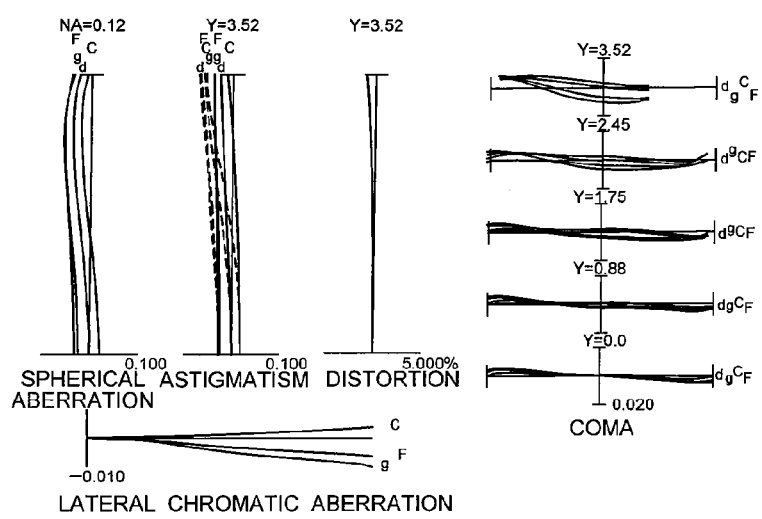
Figure 11C:
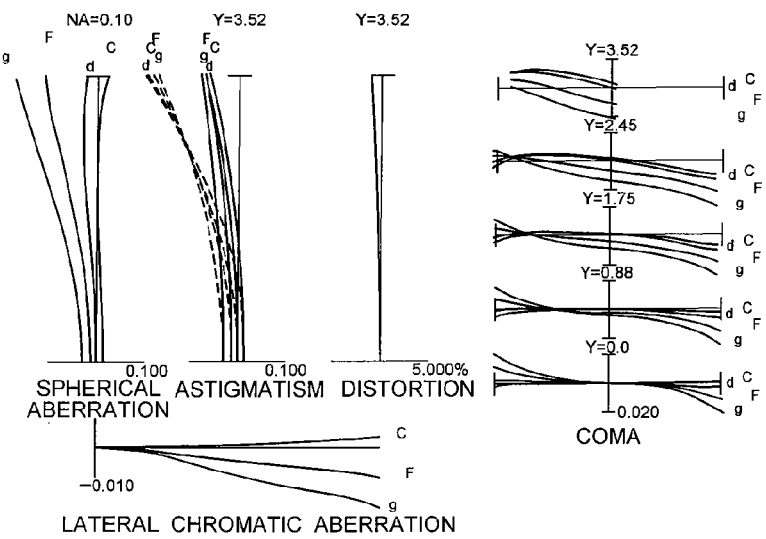

FIGS. 11A, 11B and 11C are graphs showing various aberrations of the high zoom ratio zoom lens system according to Example 2 upon focusing on a close object, in which FIG. 11A is in the wide-angle end state (Rw=300 mm), FIG. 11B is in the intermediate focal length state (Rm=300 mm), and FIG. 11C is in the telephoto end state (Rt=1000 mm).

As is apparent from the respective graphs, the zoom lens system according to Example 2 shows superb optical performance as a result of good corrections to various aberrations in the wide-angle end state, in the intermediate focal length state, and in the telephoto end state upon focusing on infinity and on a close object.

It is needless to say that although a high zoom ratio zoom lens system with a five-lens-group configuration is shown as each Example of the present application, a zoom lens system simply added by a lens group to the five-lens-group configuration is included in the spirit of the present invention.

Moreover, any lens surface composing the high zoom ratio zoom lens system according to the present application may be an aspherical surface. The aspherical surface may be fabricated by a fine grinding process, a glass molding process that a glass material is formed into an aspherical shape by a mold, or a compound type process that a resin material is formed into an aspherical shape on a glass surface.

An antireflection coating having high transmittance over a broad wavelength range may be applied to each lens surface of the high zoom ratio zoom lens system according to the present application to reduce flare or ghost images, so that high optical performance with a high contrast can be attained.

The above-described each Example only shows an specific example of a high zoom ratio zoom lens system, so that the present invention is not limited to such Examples.

According to each example of the present application, it becomes possible to provide an imaging apparatus, an imaging method, and a high zoom ratio zoom lens carrying out vibration reduction by moving an imaging device in a direction substantially perpendicular to an optical axis, capable of efficiently using effective pixels of the solid-state imaging device, and capable of securing an excellent peripheral light quantity ratio of an object image even upon carrying out vibration reduction.

Moreover, a high zoom ration zoom lens system according to the present application is suitable for an electronic still camera, and the like, capable of realizing a half angle of view of 4 degrees or less in a telephoto end state, an f-number in the telephoto end state of 6 or less, a zoom ratio of about 10, and compactness in the diameter of the lens barrel.

What is claimed is:

1. An imaging apparatus comprising:
   a high zoom ratio zoom lens system comprising, in order from an object, a first lens group having positive refractive power, a second lens group having negative refractive power, a third lens group, fourth lens group, and a fifth lens group, upon zooming from a wide-angle end state to a telephoto end state, the first lens group, the second lens group, the third lens group, and the fourth lens group being moved along an optical axis;
   a solid-state imaging device capturing an object image formed by the high zoom ratio zoom lens system;
   a detecting member that detects variation in a position of the object image;
   a driving member that moves the solid-state imaging device in a direction substantially perpendicular to the optical axis;
   a control member that controls the driving member in order to correct variation in the position of the object image; and
   a shield member with an aperture portion for limiting bundle of rays incident on the periphery of the most object side lens in the first lens group of the high zoom ratio zoom lens system; and
   the following conditional expression being satisfied:

$$0.05 < \{L \times (\Delta ht/ft)\}/(\Phi 1 - \Phi 0) < 2.00$$

where $\Phi 0$ denotes an effective diameter of the most object side lens in the first lens group of the high zoom ratio zoom lens system, $\Phi 1$ denotes a diameter of the aperture portion in the shield member, $\Delta ht$ denotes the maximum moving amount of the solid-state imaging device in the telephoto end state, $ft$ denotes a focal length of the high zoom ratio zoom lens system in the telephoto end state, and $L$ denotes a total lens length of the high zoom ratio zoom lens system in the wide-angle end state.

2. The imaging apparatus according to claim 1, wherein the third lens group has positive refractive power, the fourth lens group has positive refractive power, and the fifth lens group has positive refractive power.

3. The imaging apparatus according to claim 2, wherein the following conditional expression is satisfied:

$$0.10 < (fw \times \Delta ht)/(ft \times \Delta hw) \leq 1.0$$

where $fw$ denotes a focal length of the high zoom ratio zoom lens system in the wide-angle end state, $ft$ denotes a focal length of the high zoom ratio zoom lens system in the telephoto end state, $\Delta ht$ denotes the maximum moving amount of the solid-state imaging device in the telephoto end state, and $\Delta hw$ denotes the maximum moving amount of the solid-state imaging device in the wide-angle end state.

4. The imaging apparatus according to claim 3, wherein the fourth lens group consists of, in order from the object, a front group having positive refractive power, and a rear group having negative refractive power, and the following conditional expression is satisfied:

$$-0.45 < (f4F + f4R)/f4 < -0.20$$

where $f4$ denotes a focal length of the fourth lens group of the high zoom ratio zoom lens system, $f4F$ denotes a focal length of the front group in the fourth lens group of the high zoom ratio zoom lens system, and f4R denotes a focal length of the rear group in the fourth lens group of the high zoom ratio zoom lens system.

5. The imaging apparatus according to claim 2, wherein the fourth lens group consists of, in order from the object, a front group having positive refractive power, and a rear group having negative refractive power, and the following conditional expression is satisfied:

$$-0.45<(f4F+f4R)/f4<-0.20$$

where f4 denotes a focal length of the fourth lens group of the high zoom ratio zoom lens system, f4F denotes a focal length of the front group in the fourth lens group of the high zoom ratio zoom lens system, and f4R denotes a focal length of the rear group in the fourth lens group of the high zoom ratio zoom lens system.

6. The imaging apparatus according to claim 1, wherein the aperture portion in the shield member is a circular aperture.

7. The imaging apparatus according to claim 6, wherein the following conditional expression is satisfied:

$$0.10<(fw\times\Delta ht)/(ft\times\Delta hw)\leq 1.0$$

where fw denotes a focal length of the high zoom ratio zoom lens system in the wide-angle end state, ft denotes a focal length of the high zoom ratio zoom lens system in the telephoto end state, $\Delta ht$ denotes the maximum moving amount of the solid-state imaging device in the telephoto end state, and $\Delta hw$ denotes the maximum moving amount of the solid-state imaging device in the wide-angle end state.

8. The imaging apparatus according to claim 1, wherein the aperture portion in the shield member is a rectangular aperture.

9. The imaging apparatus according to claim 8, wherein the following conditional expression is satisfied:

$$0.10<(fw\times\Delta ht)/(ft\times\Delta hw)\leq 1.0$$

where fw denotes a focal length of the high zoom ratio zoom lens system in the wide-angle end state, ft denotes a focal length of the high zoom ratio zoom lens system in the telephoto end state, $\Delta ht$ denotes the maximum moving amount of the solid-state imaging device in the telephoto end state, and $\Delta hw$ denotes the maximum moving amount of the solid-state imaging device in the wide-angle end state.

10. The imaging apparatus according to claim 1, wherein the following conditional expression is satisfied:

$$0.10<(fw\times\Delta ht)/(ft\times\Delta hw)\leq 1.0$$

where fw denotes a focal length of the high zoom ratio zoom lens system in the wide-angle end state, ft denotes a focal length of the high zoom ratio zoom lens system in the telephoto end state, $\Delta ht$ denotes the maximum moving amount of the solid-state imaging device in the telephoto end state, and $\Delta hw$ denotes the maximum moving amount of the solid-state imaging device in the wide-angle end state.

11. The imaging apparatus according to claim 1, wherein the shield member is made up by applying shielding paint on the most object side lens surface of the first lens group.

12. The imaging apparatus according to claim 1, wherein the shield member is a plate-like member disposed in the vicinity of the most object side lens surface of the first lens group in the high zoom ratio zoom lens system.

13. The imaging apparatus according to claim 1, wherein the shield member is formed in a body with a lens-fixing member for fixing the most object side lens of the first lens group in the high zoom ratio zoom lens system.

14. The imaging apparatus according to claim 1, wherein the high zoom ratio zoom lens system carries out focusing by moving the fifth lens group along the optical axis.

15. The imaging apparatus according to claim 1, wherein the fourth lens group consists of, in order from the object, a front group having positive refractive power, and a rear group having negative refractive power, and the following conditional expression is satisfied:

$$-0.45<(f4F+f4R)/f4<-0.20$$

where f4 denotes a focal length of the fourth lens group of the high zoom ratio zoom lens system, f4F denotes a focal length of the front group in the fourth lens group of the high zoom ratio zoom lens system, and f4R denotes a focal length of the rear group in the fourth lens group of the high zoom ratio zoom lens system.

16. A high zoom ratio zoom lens system that is used as an image-taking lens of an imaging apparatus having a configuration that upon capturing an object image formed by the image-taking lens by means of a solid-state imaging device, variation in a position of the object image is detected, and in order to correct variation in the position of the object image the solid-state imaging device is moved in a direction substantially perpendicular to an optical axis, the high zoom ratio zoom lens system comprising, in order from the object:

a first lens group having positive refractive power;

a second lens group having negative refractive power;

a third lens group;

a fourth lens group; and a fifth lens group, upon zooming from a wide-angle end state to a telephoto end state, the first lens group, the second lens group, the third lens group and the fourth lens group being moved along the optical axis, a shield member with an aperture portion for limiting bundle of rays incident on the periphery of the most object side lens in the first lens group being disposed, and the following conditional expression being satisfied:

$$0.05<\{L\times(\Delta ht/ft)\}/(\Phi 1-\Phi 0)<2.00$$

where $\Phi 0$ denotes an effective diameter of the most object side lens in the first lens group of the high zoom ratio zoom lens system, $\Phi 1$ denotes a diameter of the aperture portion in the shield member, $\Delta ht$ denotes the maximum moving amount of the solid-state imaging device in the telephoto end state, ft denotes a focal length of the high zoom ratio zoom lens system in the telephoto end state, and L denotes a total lens length of the high zoom ratio zoom lens system in the wide-angle end state.

17. An imaging method for capturing an object image formed by a high zoom ratio zoom lens system by means of a solid-state imaging device with detecting variation in a position of the object image, and moving the solid-state imaging device in a direction substantially perpendicular to the optical axis so as to correct variation in the position of the object image, the imaging method comprising steps of:

providing the high zoom ratio zoom lens comprising, in order from the object, a first lens group having positive refractive power, a second lens group having negative refractive power, a third lens group, a fourth lens group, and a fifth lens group, upon zooming from a wide-angle end state to a telephoto end state, the first lens group, the second lens group, the third lens group, and the fourth lens group being moved along the optical axis;

limiting bundle of rays incident on the periphery of the most object side lens in the first lens group of the high zoom ratio zoom lens system by a shield member with an aperture portion; and satisfying the following conditional expression:

$$0.05 < \{L \times (\Delta ht/ft)\}/(\Phi 1 - \Phi 0) < 2.00$$

where $\Phi 0$ denotes an effective diameter of the most object side lens in the first lens group of the high zoom ratio zoom lens system, $\Phi 1$ denotes a diameter of the aperture portion in the shield member, $\Delta ht$ denotes the maximum moving amount of the solid-state imaging device in the telephoto end state, ft denotes a focal length of the high zoom ratio zoom lens system in the telephoto end state, and L denotes a total lens length of the high zoom ratio zoom lens system in the wide-angle end state.

18. The imaging method according to claim 17, wherein the third lens group has positive refractive power, the fourth lens group has positive refractive power, and the fifth lens group has positive refractive power.

19. The imaging method according to claim 17, further comprising a step of:

satisfying the following conditional expression:

$$0.10 < (fw \times \Delta ht)/(ft \times \Delta hw) \leq 1.0$$

where fw denotes a focal length of the high zoom ratio zoom lens system in the wide-angle end state, ft denotes a focal length of the high zoom ratio zoom lens system in the telephoto end state, $\Delta ht$ denotes the maximum moving amount of the solid-state imaging device in the telephoto end state, and $\Delta hw$ denotes the maximum moving amount of the solid-state imaging device in the wide-angle end state.

* * * * *